United States Patent [19]
Erich et al.

[11] 3,930,789
[45] Jan. 6, 1976

[54] DEVICE FOR PREHEATING WASTE GASES OF AN EXHAUST CONDUIT

[75] Inventors: Kenner Erich, Esslingen-Waldenbronn; Hans Hintennach, Baltmansweiler, both of Germany

[73] Assignee: J. Eberspacher, Germany

[22] Filed: Feb. 20, 1974

[21] Appl. No.: 444,183

[30] Foreign Application Priority Data
Mar. 6, 1973  Germany........................ 23110647

[52] U.S. Cl. .................... 432/222; 432/63; 60/286; 60/303
[51] Int. Cl.² ........................................... F01N 3/00
[58] Field of Search ......... 432/222, 63; 60/286, 303

[56] References Cited
UNITED STATES PATENTS

| | | | |
|---|---|---|---|
| 3,083,525 | 4/1963 | Morris .................................. | 60/303 |
| 3,117,770 | 1/1964 | Campbell............................ | 432/222 |
| 3,174,277 | 3/1965 | Hettich ................................ | 60/308 |
| 3,226,206 | 12/1965 | Hettich et al..................... | 23/288 F |
| 3,791,143 | 2/1974 | Keith ................................... | 60/286 |
| 3,829,281 | 8/1974 | Briggs.................................. | 432/63 |

FOREIGN PATENTS OR APPLICATIONS
27,330   8/1932   Netherlands........................ 432/222

*Primary Examiner*—John J. Camby
*Attorney, Agent, or Firm*—McGlew and Tuttle

[57] ABSTRACT

A device for preheating gases of waste lines, particularly for the catalytic purification of exhaust gases comprises a conduit for the passage of the waste gases which is provided with a widened portion defining an annular flow passage around a portion of the conduit for preheated gases with a through flow for the heated gases and the waste gases out the opposite end of the conduit. The preheated gases are generated in a tubular burner which is tangentially connected into the waste gas conduit at the location of the widened section thereof. The burner includes means for feeding air and fuel into the end of the tubular burner and igniting them in a combustion chamber thereof for flow into a partially annular space around a portion of the waste gas conduit through an intermediate convergent section into the flow path of the gases through the conduit.

5 Claims, 4 Drawing Figures 3,930,789

DEVICE FOR PREHEATING WASTE GASES OF AN EXHAUST CONDUIT

FIELD AND BACKGROUND OF THE INVENTION

This invention relates in general to the construction of waste gas heating devices and, in particular, to a new and useful device particularly for heating exhaust gases of internal combustion engines for the catalytic purification thereof which includes a conduit for the passage of the exhaust gases having a tubular burner affixed thereto which generates high temperature gases which are passed into the conduit into association with the exhaust gases for flow through the connecting conduit.

DESCRIPTION OF THE PRIOR ART

The present invention has particular application for the catalytic purification of exhaust gases. Another field of application is the preheating of combustion air in the suction pipe of diesel engines. In both fields, improved combustion, and thereby reduction of the toxic content of the exhaust gases, is of primary concern. Experience has shown that the invention may be successfully applied in any stationary device in which combustion takes place, for example in garbage incinerators, petrol chemical plants, or even in household heating installations where a catalytic purification of the flue gases may also be provided at least for the purpose of reducing the toxic content of the exhaust gases.

It has been known for some time to use catalysts for the detoxication of waste gases. It is also known that a catalyst requires a certain working temperature range for successful operation, and this is preferably in the range of from 400 to 600°C. Only after such a temperature has been reached can the detoxication set in.

It is also known that just at the start of a combustion process, an exceptionally strong emission of toxic materials takes place. In the known devices for catalytic purification, those particularly unfavorable conditions are known to take approximately 60 sec., that is, during this time not only no detoxication takes place, but also a considerable volume of toxic substances is blown off. The so-called California test for automobiles requires that the waste gases be cleaned at the very beginning of the starting operation because of this.

In order to reduce the response time of the catalyzer, it is known to locate the catalyzer as close as possible to the engine. Such a location has the advantage of an early response of the catalyst whose temperature is rapidly increased in most cases by the hot exhaust gases. However, there is a considerable drawback in that in the course of the subsequent operation, the temperature of the hot exhaust gases will rise to about 1000°C and the catalyst will be "burnt down", that is, it will become completely ineffective. The life of the catalyzers in such arrangements is so short that their mounting, for example, in motor vehicles cannot be recommended.

It has also been proposed to associate the catalyst with an additional combustion chamber and to bring it directly to the working temperature. In such cases again, however, the burning down of the catalysts cannot be prevented. In order to further improve the catalytic oxidation of the toxic substances contained in the waste gases, it is also known to supply secondary air to the catalyzer. To this end, a "Saginaw" pump is used, which is driven off the engine through a V-belt transmission.

SUMMARY OF THE INVENTION

In accordance with the invention, there is provided an arrangement in which the air or the waste gas which is usually and preferably supplied to a catalyzer, is heated up quickly and independently of the engine power output. This makes it possible to mount the catalyzer at the most suitable location where it is protected against overheating or burning by the hot exhaust gases of the engine but where it still becomes fully effective, that is, able to perform an efficient detoxication rapidly, that is approximately from 1 to 2 seconds after the start of the engine.

In view of the fact that the air purifying operation requires that the catalyzer be supplied with fresh air and heat, the invention provides a separate burner which is connected to the conduit for the exhaust gases which is supplied with fuel and air to generate gaseous products of combustion which are directed into heating association with the waste gases and subsequent combined flow therewith. The invention provides a connection to the conduit for the waste gases by a tubular burner such that the flow of the gases generated by the burner is through an annular passage and then radially inwardly into the central flow stream for the exhaust gases in the conduit. The burner is designed as a precombustion chamber having a tangential excess air inlet which is intermittently intermixed with the fuel directed through the end of the tubular burner and ignited in a combustion chamber which connects directly to an annular space surrounding the exhaust conduit. The combustion gases which are generated in the burner flow initially around a portion of the exhaust conduit and then join the gas flow in an exit portion of the connecting conduit for the exhaust gases.

It has been proved that with the inventive device, the catalyst can be brought to its working temperature almost instantly after the starting of the engine. In normal cases, a simultaneous ignition in the engine and in the combustion chamber of the burner will take place. After some 1 or 2 seconds, the burner is up to its operating temperature and the gaseous products of combustion heat the exhaust gases to a temperature suitable for reaction with the catalyst. This process is assisted by the rapidly heated secondary air which is supplied into the combustion chamber by the "Saginaw" pump or by a small compressore. In the normal case, the detoxicated gases which are present are expelled during the first 1 or 2 seconds. When even this is not acceptable, the inventive device may be operated as follows:

A known time-delay element is mounted between the ignition of the engine and the ignition of the inventive device. This element has the effect that the inventive device is ignited instantly while the engine is ignited with delay, for example, one or two seconds later. During this delay time, the Saginaw pump must be driven by the battery of the automobile or, as is usual with diesel engines, by a vehicle-borne compressed air supply. Thereby, the waste gas is heated up without delay and the catalyst becomes effective instantly.

In accordance with a development of the invention, a partition baffle extending over an annular sector of from 60° to 120° is provided between the end of the tubular burner and the connecting conduit for the waste gases which extends centrally within the baffling. The baffle is arranged parallel to the front wall of the combustion chamber of the burner and serves to improve the combustion process in the combustion chamber by stabilizing the flame. The baffle also prevents the flame from being drawn in the direction of the exhaust conduit. The strong whirling motion in the precombustion chamber is produced in a long time with a most favorable turbulence of the fuel air mixture so that the combustion flame is rotated also.

A connection socket for igniting the gases in the burner is provided on the end of the tubular burner at a location overlying a mixing chamber neck portion. The ignition of the inflammable mixture is brought about by introducing combustion air and fuel into the combustion chamber, preferably in a whirling motion, and preferably so as to atomize the fuel which is ignited by an igniter element. An attachment is advantageously provided before the mixing nozzle in the form of a valve with connections for fuel and combustion air, and another mixing passage of a smaller diameter is provided between the nozzle and the mixer neck. Thus, the fuel and the necessary combustion air can be supplied in a particularly favorable manner, the fuel air mixture being produced in the mixing nozzle and, in accordance with the invention, made still more homogeneous in the follwing mixing passage.

Also, in accordance with the invention, the attachment for the burner, which comprises a mixing nozzle, and separate fuel and combustion air connections also is provided with an additional mixing passage with a connection for a control line. For example, a thermostat may be provided, and the ignition may be cut off as soon as the necessary temperature is reached. Another advantageous feature of the invention is that the combustion chamber includes a cylindrical portion and an adjacent conical portion which narrows in the direction of the waste gas flow. A conduit for the heated waste gas which passes to the catalyzer is axially aligned with, and spaced from, the waste gas supply conduit portion. A particularly strong heating effect is thereby obtained. That is, the heated waste gas is supplied to the catalyzer together with the hot combustion gas and air coming from the burner.

Experience has shown that aside from the application of the device to a catalytic purification of waste gases, the inventive device may also be used with considerable advantage in a suction conduit of diesel engines for preheating the combustion air.

The various features of novelty which characterize the invention are pointed out with particularity in the claims annexed to and forming a part of this disclosure. For a better understanding of the invention, its operating advantages and specific objects attained by its uses, reference should be had to the accompanying drawings and descriptive matter in which there is illustrated a preferred embodiment of the invention.

GENERAL DESCRIPTION OF A PREFERRED EMBODIMENT

Figure 1:
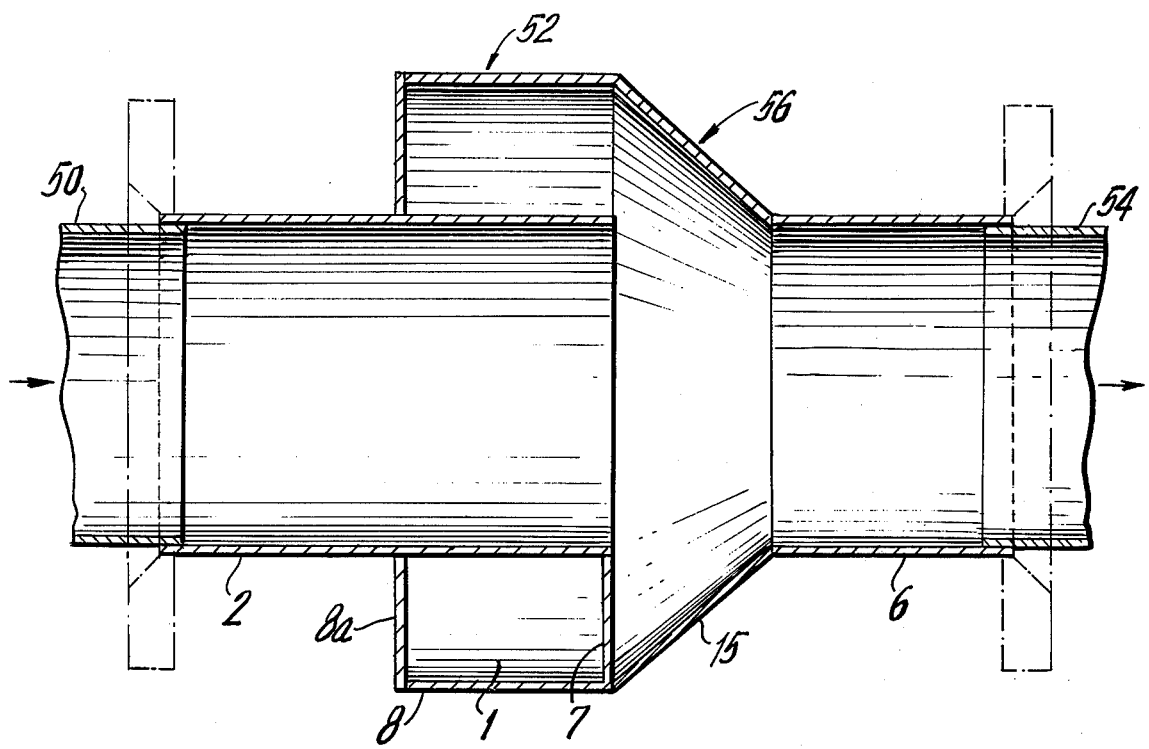
FIG. 1 is a longitudinal sectional view of a waste gas connecting conduit constructed in accordance with the invention.

Referring to the drawings in particular, the invention embodied therein, comprises a device for preheating waste gases, particularly for treating exhaust gases, which are delivered through an exhaust conduit 50 particularly of an internal combustion engine of an automobile. The device comprises a connecting conduit assembly, generally designated 52, which is located between exhaust conduit 50 and a connection 54 leading to a catalytic material chamber.

In accordance with the invention, the connection assembly 52 comprises a connection conduit made up of an entrance conduit portion 2, a transition conduit portion 54 and a discharge conduit portion 6. The entrance conduit portion 2 is aligned with the discharge conduit portion 6, and the transition conduit portion 54 includes an enlarged intermediate cylindrical portion 8 which surrounds conduit portion 2 and is closed at its rear end by an annular wall 8a. In addition, enlarged conduit portion 8 is connected through a transition 15 having converging walls to the continuation conduit portion 6.

In accordance with a feature of the invention, a combustion gas generator or burner, generally designated 58, includes a tubular combustion chamber or mixer neck 3 defining a precombustion chamber 60 which communicates into the enlarged portion 8 and to an interior annular passage 1 defined around the periphery of the inlet conduit portion 2. A partition baffle 7 is connected between the end of the gas conduit located inside the enlarged portion 8 and the outer periphery of the enlarged portion 8 and it advantageously extends through a portional annular range, for example approximately 80°, and it is perpendicular to the axis of flow through conduit 2. Baffle 7 ensures that the flame of the combustion gases generated in the burner 58 is first directed around conduit 2 and not drawn out through the exit to the conduit portion 6.

The treated exhaust gases pass through conduit 2 and join with the high temperature combustion gases in transition portion 56 and flow into conduit 6 for further flow into a catalyzer connected to conduit 54. The catalyzer is located in the most suited place in the engine exhaust gas system. Due to the high temperatures which are produced by the combustion gases in the annular chamber 1, the end portion of the exhaust gas conduit portion 2 becomes red hot so that the exhaust gases flowing through this conduit are heated up to some hundred degrees centigrade.

Figure 2:
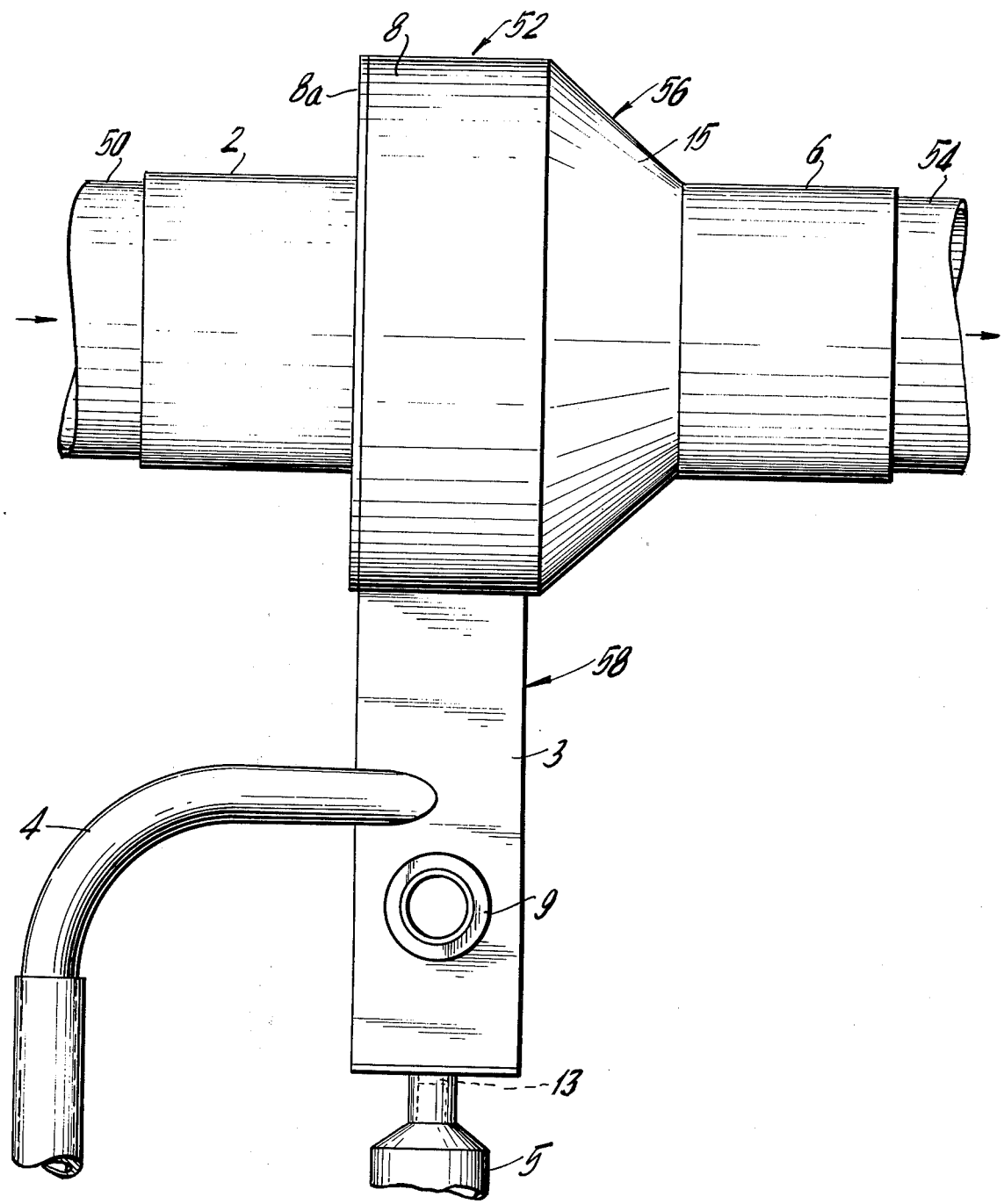
FIG. 2 is a top plan view of the device shown in FIG. 1.
Figure 3:
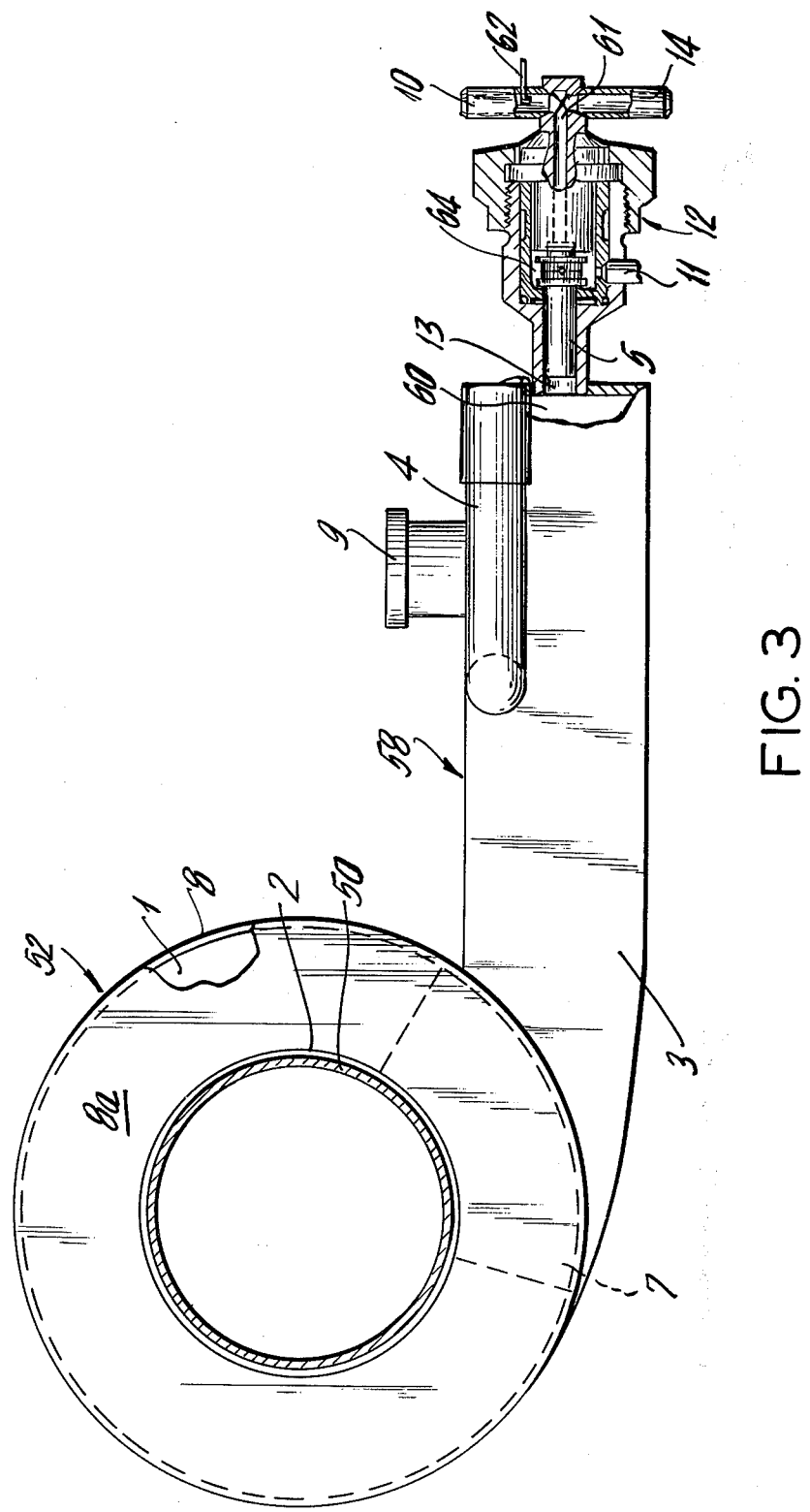
FIG. 3 is an end elevational view of the device shown in FIG. 1.

As shown in particular in FIGS. 2 and 3, the tubular burner 3 forms a mixer neck acting as a precombustion chamber and it is tangentially connected into the enlarged cylindrical portion 8 of device 52. In addition, an excess air conduit 4 is connected tangentially into combustion chamber 60 so that the fuel components and the gaseous products of combustion which are generated are given a whirling motion as they pass through tubular burner 3. Because of the tangential radial feeding of the secondary air, a cooling screen is produced along the walls of the precombustion chamber 3 so that they are kept at a relatively low temperature and no detrimental radiation takes place. In addition, this whirling motion results in a delay time for the supplied fuel and combustion air so that a very convenient turbulence of the mixture is obtained and excellent combustion ensues. The secondary air may be fed in either by a small compressor or supplied from a vehicle-borne compressed air system. A connection socket 9 for an ignition device, such as a spark plug, is provided at the outer end of burner 58. An attachment 12 for supplying combustion components extends axially outwardly from the outer end of burner 58 and it comprises a mixing nozzle 5. Combustion air connections 14 connects to an axial flow passage 61 and a control conduit 10 is provided with a thermostat 62 communicating with passage 61 in order to provide means for regulating the starting and stopping of the device. The separate conduit 11 connects into a radial passage 64 which is in communication with central passage 61.

Figure 4:
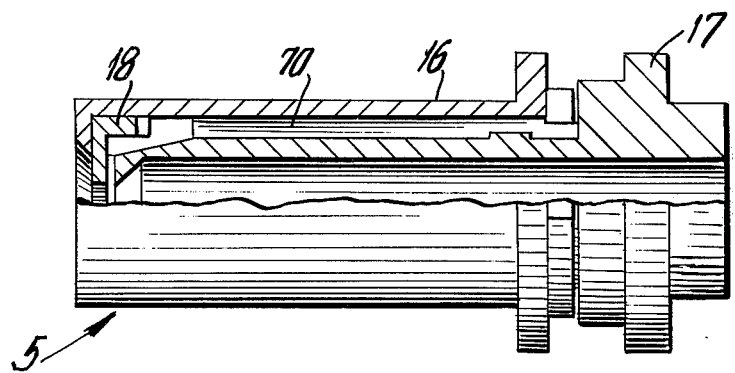
FIG. 4 is an enlarged partial longitudinal view of the mixing nozzle portion of the burner shown in FIG. 3.

A rich fuel air mixture of high ignition quality is produced by atomization of the fuel in the air jet in nozzle 5, and this mixture is ignited by an ignition means mounted on connection socket 9 of mixer wall 3. Mixing nozzle 5 includes a sleeve 17, as shown in FIG. 4, which is arranged radially inwardly of an outer sleeve 16 so as to define a passage 70 therebetween for the fuel supply. An atomizing ring 18 is mounted at the discharge end of the sleeve 17 in spaced relationship therewith and serves for atomizing the fuel supply. The inflammable mixture produced in the zone of atomizing ring 18 mixes further in an additional mixing passage 13, and passes into mixer combustion chamber 60.

While a specific embodiment of the invention has been shown and described in detail to illustrate the application of the principles of the invention, it will be understood that the invention may be embodied otherwise without departing from such principles.

What is claimed is:

1. A device for the rapid and independent preheating of admixing air, preferably secondary air for a catalytic exhaust gas treatment device in internal combustion engines, comprising an exhaust gas conduit having separated and aligned entrance and discharge portions for the flow of exhaust gases therethrough, means defining an annular chamber around said entrance portion adajcent the end thereof closest to said discharge portion and having an inwardly tapered transition connected to said discharge portion and enclosing the separation between said entrance and discharge portions, a burner having tubular discharge connected into said annular chamber, said annular chamber having an opening at the discharge end thereof adjacent said transition covering a sector of 60° to 120°, combustion means for generating combustion gases in said burner housing and delivering the combustion gases through said tubular discharge for partial annular flow around said annular chamber and exit through the opening of said annular chamber to said discharge, the opening being substantially diametrically opposite said entrance connection whereby the gases are whirled around the annular chamber before they are directed outwardly therefrom and into the transition and they are whirled in a whirling motion for admixing with the exhaust gases for combined flow of the combustion gases and exhaust gases through said discharge.

2. A device according to claim 1, including a conduit for secondary air, connected into said burner tubular discharge.

3. A device for preheating gases, according to claim 1, wherein said tubular burner has a connection socket for ignition means on a side wall thereof, and having an end wall with a connection for fuel and combustion air.

4. A device for preheating gases, according to claim 1, wherein said combustion means for includes a separate connection for an igniter and an end fitting for fuel and combustion air having a mixing nozzle portion with a central passage for mixed fuel and air and a further mixing passage located downstream of said mixing passage.

5. A device for preheating gases, according to claim 4, including a further connection for control means on said burner.

* * * * *